(12) United States Patent
Kim (10) Patent No.: US 7,751,787 B2
(45) Date of Patent: Jul. 6, 2010

(54) TIMING GENERATOR AND METHODS THEREOF

(75) Inventor: Kyoung-Man Kim, Seoul (KR)

(73) Assignee: Samsung Electronics Co., Ltd., Gyeonggi-do (KR)

( * ) Notice: Subject to any disclaimer, the term of this patent is extended or adjusted under 35 U.S.C. 154(b) by 942 days.

(21) Appl. No.: 11/500,337

(22) Filed: Aug. 8, 2006

(65) Prior Publication Data

US 2007/0036254 A1 Feb. 15, 2007

(30) Foreign Application Priority Data

Aug. 11, 2005 (KR) .................. 10-2005-0073576

(51) Int. Cl.
*H04B 1/18* (2006.01)
(52) U.S. Cl. ............... 455/181.1; 455/241.1; 455/242.1
(58) Field of Classification Search ............. 455/181.1, 455/242.2, 242.1, 208, 231, 243.1, 244.1, 455/245.1, 245.2, 171.1, 183.1; 327/158, 327/276, 278, 264, 261–262
See application file for complete search history.

(56) References Cited

U.S. PATENT DOCUMENTS

| 6,265,918 | B1 * | 7/2001 | Toda ........................... 327/146 |
| 6,836,166 | B2 * | 12/2004 | Lin et al. ..................... 327/158 |
| 6,940,330 | B2 * | 9/2005 | Okayasu ...................... 327/261 |
| 7,475,310 | B2 * | 1/2009 | Negishi ........................ 714/731 |

FOREIGN PATENT DOCUMENTS

| JP | 2001-108725 | 4/2001 |
| JP | 2003-130927 | 5/2003 |
| KR | 10-2003-0089120 A | 11/2003 |
| KR | 10-2004-0010255 A | 1/2004 |
| KR | 2004-74982 | 8/2004 |

OTHER PUBLICATIONS

Korean Office Action dated Sep. 26, 2006 for counterpart Korean Application No. 10-2005-73576.

* cited by examiner

*Primary Examiner*—Pablo N Tran
(74) *Attorney, Agent, or Firm*—Harness, Dickey & Pierce, P.L.C.

(57) ABSTRACT

A timing generator and methods thereof are provided. In a first example method, a timing control signal may be produced by generating a base clock signal and a higher delay resolution clock signal, a clock cycle of the higher delay resolution signal being less than a clock cycle of the base clock signal. A first control word output signal may be generated by synchronizing a control word with the base clock signal. A second control word output signal may be generated by synchronizing the first control word output signal with the higher delay resolution clock signal and generating at least one additional control word output signal based on the second control word output signal and the higher delay resolution clock signal, the first, second and at least one additional control word output signal each having different delay resolutions. In a second example method, a timing control signal may be produced by generating a plurality of control word output signals, each of the plurality of control word output signals having a different delay resolution and selecting one of the plurality of control word output signals based on a delay resolution of the selected control word output signal, the delay resolution of the selected control word output signal better suited for interaction with an external device than delay resolutions of other of the plurality of control word output signals. A timing generator may be configured to perform either of the above-described first and second example methods.

25 Claims, 5 Drawing Sheets

TIMING GENERATOR AND METHODS THEREOF

PRIORITY STATEMENT

This application claims priority under 35 U.S.C. §119 to Korean Patent Application No. 2005-73576 filed on Aug. 11, 2005, the contents of which is incorporated herein by reference in its entirety.

BACKGROUND OF THE INVENTION

1. Field of the Invention

Example embodiments of the present invention relate generally to a timing generator and methods thereof, and more particularly to a timing generator and methods of generating a timing control signal.

2. Description of the Related Art

Conventional mobile communication systems (e.g., mobile phones, personal communication services (PCS), and personal digital assistants (PDAs), etc.) may be configured to support wireless communications.

Figure 1:
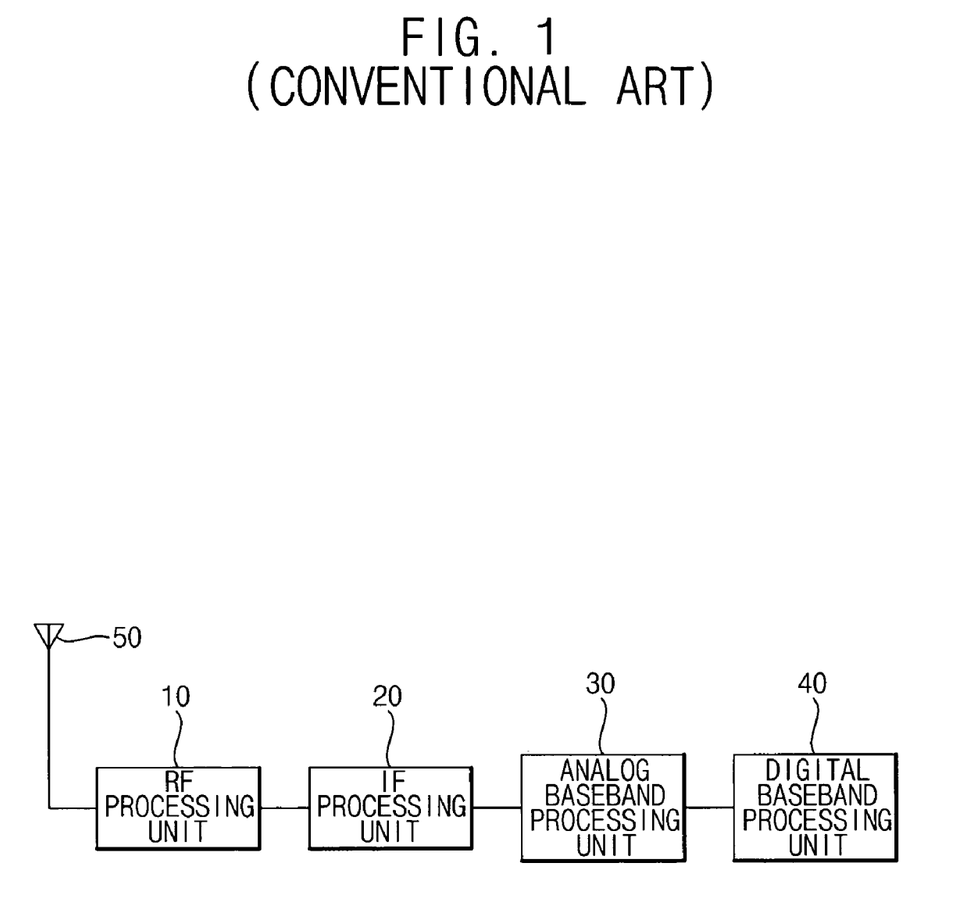
FIG. 1 is a block diagram illustrating a conventional wireless digital transceiver.

FIG. 1 is a block diagram illustrating a conventional wireless digital transceiver. Referring to FIG. 1, the conventional wireless digital transceiver may include an antenna 50, a radio frequency (RF) processing unit 10, an analog baseband processing unit 30 and a digital baseband processing unit 40. The wireless digital transceiver of FIG. 1 may employ an intermediate frequency (IF) (e.g., within a superheterodyne wireless digital transceiver). The conventional wireless digital transceiver of FIG. 1 may further include an intermediate frequency (IF) processing unit 20 positioned between the RF processing unit 10 and the analog baseband processing unit 30.

Referring to FIG. 1, the RF processing unit 10 may demodulate an RF signal received from the antenna 50 in a receiving operation, and may convert the received RF signal into a baseband signal. In a transmitting operation, the RF processing unit 10 may modulate the baseband signal or an IF signal supplied from a host device and may transmit the modulated signal to the antenna 50.

Referring to FIG. 1, the intermediate frequency processing unit 20 may convert an IF signal into a baseband signal during a receiving operation, and may convert a baseband signal into an IF signal during a transmitting operation. During the receiving operation, the analog baseband processing unit 30 may convert the received analog baseband signal into a digital signal through an analog-to-digital conversion, and may further convert a sampling rate thereof to transmit the converted signal to the digital baseband processing unit 40. During the transmitting operation, the analog baseband processing unit 30 may convert the sampling rate of the received digital signal, and may further convert the received digital signal into an analog baseband signal through a digital-to analog conversion and may output the analog baseband signal.

Referring to FIG. 1, the digital baseband processing unit 40 may perform a channel decoding of the digital signal transmitted from the analog baseband processing unit 30 during the receiving operation, and may perform a channel coding (e.g., encoding) during the transmitting operation.

Referring to FIG. 1, each of the elements 10 through 40 may be implemented as integrated chips. For example, the RF processing unit 10 may be implemented in a RF transceiver chip, the analog baseband processing unit 30 may be implemented in an analog baseband chip, etc. Accordingly, an analog baseband chip may be configured to be compatible with numerous types of RF transceiver chips.

A conventional analog baseband chip may include a timing generator, which may alternatively be referred to as a timing generation unit (TGU). The timing generator may synchronize a control word for controlling an analog in-phase/quadrature (I/Q) signal to be transmitted to the RF transceiver chip with an internally generated clock signal, and may output the synchronized control word.

A clock signal used to output the control word may be synchronized with an operating clock signal of the external RF transceiver chip to allow the timing generator to cooperate with the RF transceiver chip. Accordingly, the timing generator may be configured to support the delay resolution of the clock signals of the RF transceiver chips so as to be adaptable to a variety of operating clock signals among different RF transceiver chips.

The delay resolution may represent a signal precision level for identifying a delay of the clock signal. Conceptually, delay resolution may be similar to image resolution. The delay resolution may be proportional to a frequency of the clock signal and inversely proportional to a period of the clock signal. For example, higher delay resolutions may be associated with higher frequencies and lower unit cycles (i.e., clock cycles) in corresponding clock signals. Likewise, lower delay resolutions may be associated with lower frequencies and higher unit cycles in corresponding clock signals.

However, because conventional timing generators may output the control word to a transceiver chip based upon an internally generated base clock signal, it may be difficult to configure a conventional timing generator to support different types of clock signals (e.g., because such signals may be generated "external" to the timing generator).

Figure 2:
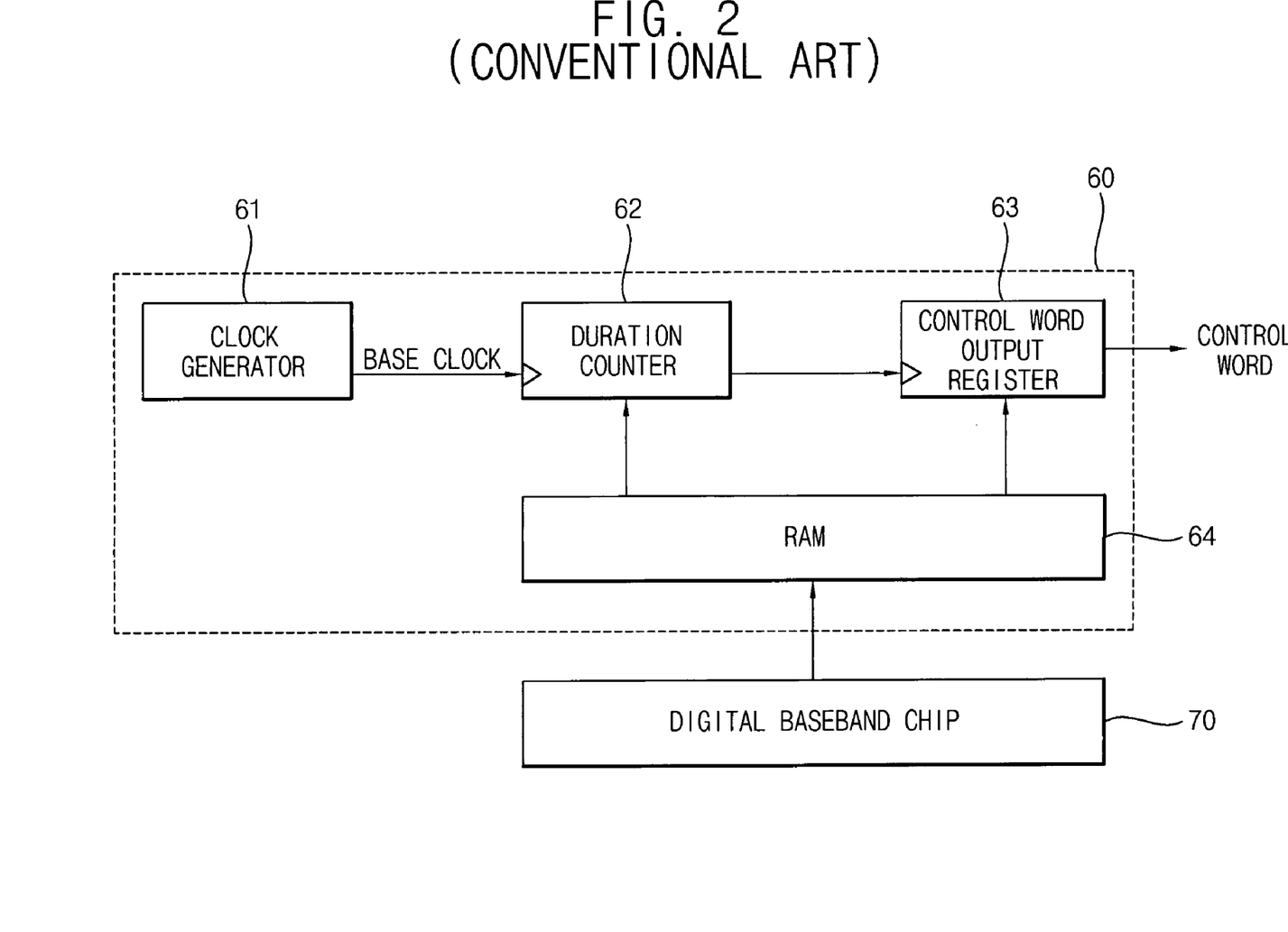
FIG. 2 is a block diagram illustrating a conventional timing generator and a digital baseband chip.

FIG. 2 is a block diagram illustrating a conventional timing generator 60 and a digital baseband chip 70. The timing generator 60 may form a portion of an analog baseband chip (not shown).

Referring to FIG. 2, the timing generator 60 may include a clock generator 61, a random-access memory (RAM) 64, a duration counter 62 and a control word output register 63. The clock generator 61 may generate a base clock signal for outputting a control word and for controlling respective units of the timing generator 60. The RAM 64 may be connected to the external digital baseband chip 70. The RAM 64 may store information received from the digital baseband chip 70. The stored information may include, for example, a plurality of control word identifications (IDs), addresses of a number of control words, and clock cycles for controlling output timings of the respective control words.

Referring to FIG. 2, the duration counter 62 may receive, from the RAM 64, clock cycle information for controlling an output of the respective control words. The duration counter 62 may synchronize with (e.g., count clock cycles of) a base clock signal based on the received clock cycle information. Accordingly, a control word may be outputted during a duration period, which may be counted by the duration counter 62, based on received clock cycle information.

Referring to FIG. 2, the control word output register 63 may receive the control word transferred from the RAM 64 and may output the transferred control word during the duration time counted by the duration counter 62, such that the control word may be supplied to an external RF transceiver chip (not shown).

As described above, the timing generator 60 may output the control word for controlling a timing of an analog (I/Q) signal during a fixed clock cycle, which may be designated by the digital baseband chip 70, according to the base clock signal generated by the clock generator 61.

However, conventional timing generators may not be configured to adapt to RF transceiver chips having different delay resolutions, because the outputted control words may only be capable of being synchronized with the base clock signal, which may be generated internally at the timing generator (e.g., as shown in FIG. 2). In other words, a conventional timing generator may only be capable of operation with an RF transceiver chip having a particular delay resolution.

For example, if a unit cycle (e.g., clock cycle or period) of the base clock signal generated in the timing generator is a ⅛ symbol clock and a unit cycle of the RF transceiver chip for transferring the control word is a 1/24 symbol clock, the timing generator may not support an optimal operation speed of the RF transceiver chip because the delay resolution of the operation clock for the RF transceiver chip may be three times higher than that of the base clock signal for the clock generator. Thus, in order to synch the timing generator with the RF transceiver chip, the base clock signal at the timing generator may be redesigned so as to correspond with an operation clock signal of the RF transceiver chip. Such a redesign process is a laborious, time-consuming and expensive process.

SUMMARY OF THE INVENTION

An example embodiment of the present invention is directed to a timing generator, including a clock generating unit configured to generate a base clock signal and a higher delay resolution signal, a clock cycle of the higher delay resolution signal being less than a clock cycle of the base clock signal, a control word output register configured to generate a first control word output signal by synchronizing a control word with the generated base clock signal, a synchronization unit configured to generate a second control word output signal by synchronizing the first control word output signal with the higher delay resolution clock signal and a variable delay resolution support unit configured to generate at least one additional control word output signal based on the second control word output signal and the higher delay resolution clock signal, the first, second and at least one additional control word output signals each having different delay resolutions.

Another example embodiment of the present invention is directed to a method of generating a timing control signal, including generating a base clock signal and a higher delay resolution clock signal, a clock cycle of the higher delay resolution signal being less than a clock cycle of the base clock signal, generating a first control word output signal by synchronizing a control word with the base clock signal, generating a second control word output signal by synchronizing the first control word output signal with the higher delay resolution clock signal and generating at least one additional control word output signal based on the second control word output signal and the higher delay resolution clock signal, the first, second and at least one additional control word output signal each having different delay resolutions.

Another example embodiment of the present invention is directed to a method of generating a timing control signal, including generating a plurality of control word output signals, each of the plurality of control word output signals having a different delay resolution and selecting one of the plurality of control word output signals based on a delay resolution of the selected control word output signal, the delay resolution of the selected control word output signal better suited for interaction with an external device than delay resolutions of other of the plurality of control word output signals.

BRIEF DESCRIPTION OF THE DRAWINGS

The accompanying drawings are included to provide a further understanding of the invention, and are incorporated in and constitute a part of this specification. The drawings illustrate example embodiments of the present invention and, together with the description, serve to explain principles of the present invention.

DETAILED DESCRIPTION OF EXAMPLE EMBODIMENTS OF THE PRESENT INVENTION

Example embodiments of the present invention are described more fully hereinafter with reference to the accompanying drawings, in which example embodiments of the present invention are shown. Example embodiments of the present invention may, however, be embodied in many different forms and should not be construed as limited to the example embodiments set forth herein. Rather, these example embodiments are provided so that this disclosure will be thorough and complete, and will fully convey the scope of the invention to those skilled in the art. Like numbers refer to like elements throughout.

It will be understood that although the terms first and second are used herein to describe elements and should not be limited by these terms. These terms are used to distinguish one element from another. Thus, a first element discussed below could be termed a second region, layer or section, and similarly, a second element may be termed a first element without departing from the teachings of the present invention.

The terminology used herein is for the purpose of describing particular embodiments and is not intended to be limiting of the invention. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Figure 3:
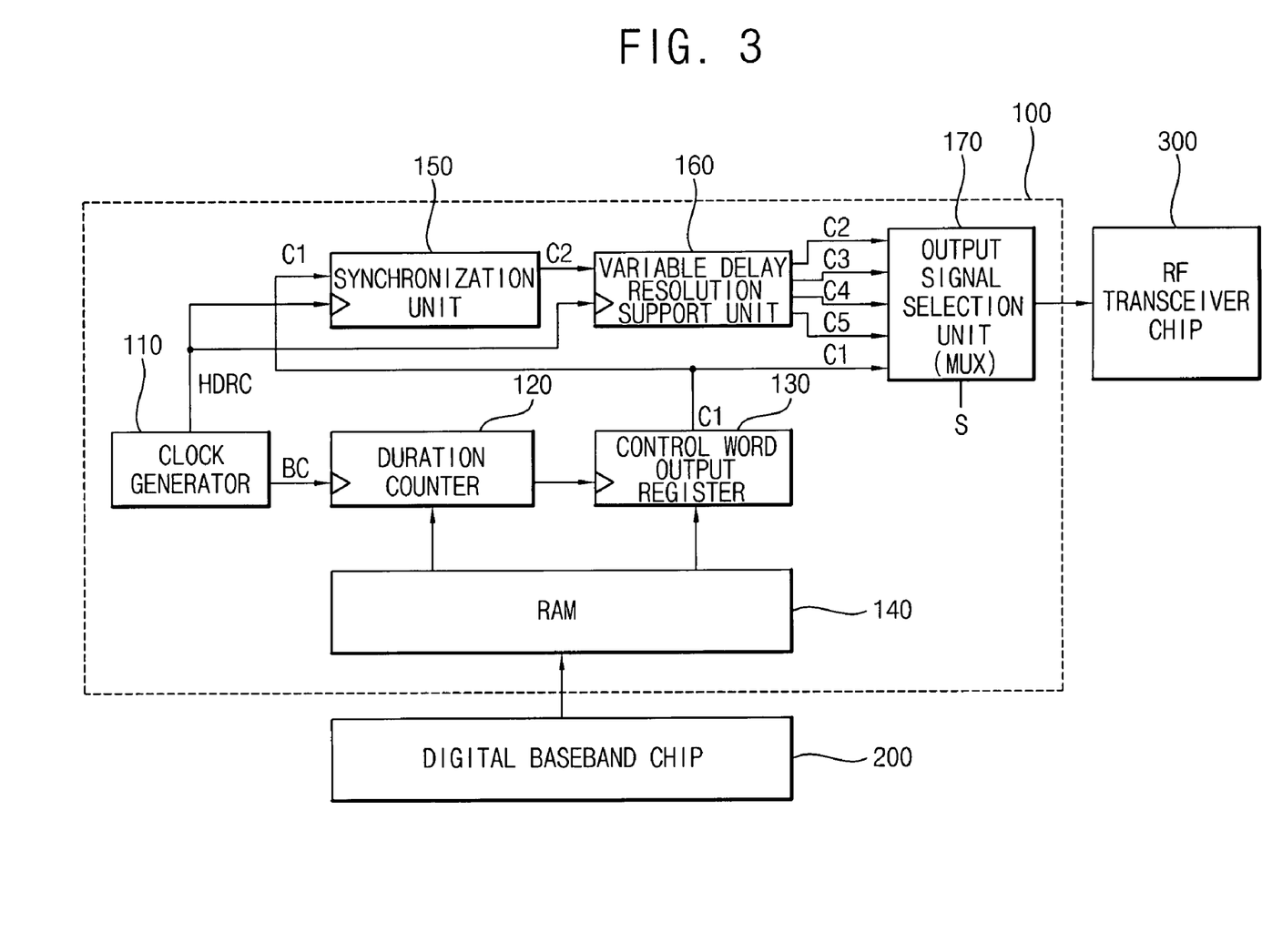
FIG. 3 is a block diagram illustrating a timing generator according to an example embodiment of the present invention.

FIG. 3 is a block diagram illustrating a timing generator 100 according to an example embodiment of the present invention.

In the example embodiment of FIG. 3, the timing generator 100 may include a clock generator 110, a random-access memory (RAM) 140, a duration counter 120, a control word output register unit 130, a synchronization unit 150, a variable delay resolution support unit 160 and an output signal selection unit 170.

In the example embodiment of FIG. 3, the clock generator 110 may produce a base clock signal BC and a higher delay resolution clock HDRC having a unit cycle shorter (e.g., $\frac{1}{24}^{th}$ of) the base clock signal BC. Because the higher delay resolution clock HDRC has a shorter relative cycle than that of the base clock signal, the higher delay resolution clock signal may likewise have a higher delay resolution (e.g., about 24 times as high) as that of the base clock signal.

In the example embodiment of FIG. 3, the base clock signal BC may be transferred to the duration counter 120, and the higher delay resolution clock signal HDRC may be provided as a clock signal to the synchronization unit 150 and the variable delay resolution support unit 160.

In the example embodiment of FIG. 3, the RAM 140 may be connected to an external digital baseband chip 200. The RAM 140 may store information associated with an output of the control word received from the digital baseband chip 200. The stored information, to be used for the output of the control word, may include a plurality of control word identifications (IDs), an address of each control word and clock cycle information for controlling output timings of the respective control words.

In the example embodiment of FIG. 3, the duration counter 120 may receive the base clock signal BC from the clock generator 110 and may provide the control word output register 130 with a clock signal for outputting a control word, based on clock cycle information of the corresponding control word provided from the RAM 140.

In the example embodiment of FIG. 3, the control word output register 130 may receive the control word transferred from the RAM 140. The control word output register 130 may synchronize the corresponding control word with the base clock signal BC during a clock cycle, counted by the duration counter 120, to output a first control word output signal C1. Accordingly, the corresponding control word may be outputted as the first control word output signal C1 in synchronization with the base clock signal BC through the control word output register 130 during the corresponding clock cycle. Because the first control word output signal C1 outputted from the control word output register 130 may be synchronized with the base clock signal BC, the first control word output signal C1 may have the same delay resolution as the base clock signal BC. The first control word output signal may be provided to the synchronization unit 150 and the output signal selection unit 170.

In the example embodiment of FIG. 3, the synchronization unit 150 may receive the first control word output signal C1 (e.g., the control word outputted from the control word output register 130) and may synchronize the received first control word output signal C1 with the higher delay resolution clock signal HDRC to generate a second control word output signal C2. Therefore, the second control word output signal C2 outputted from the synchronization unit 150 may be a control word having a higher delay resolution (e.g., about 24 times higher) than the delay resolution of the base clock signal BC.

In the example embodiment of FIG. 3, the variable delay resolution support unit 160 may receive the higher delay resolution clock signal HDRC provided from the clock generator 110 and the second control word output signal C2 provided from the synchronization 150 to output second through fifth control word output signals C2, C3, C4 and C5.

In an example, the control word output signals C2, C3, C4 and C5 may each have different delay resolutions.

Figure 4:
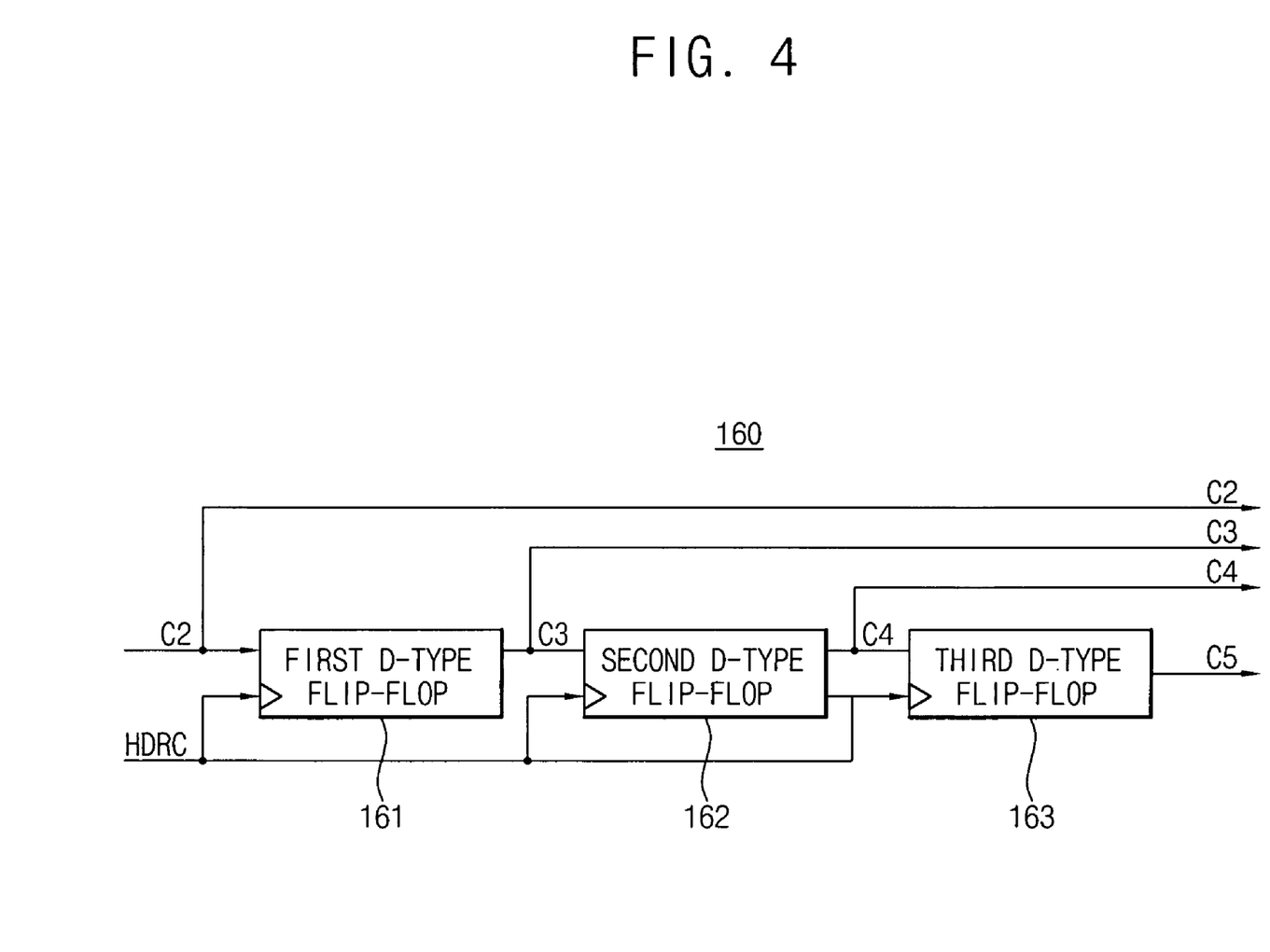
FIG. 4 is a block diagram illustrating a variable delay resolution support unit according to another example embodiment of the present invention.

FIG. 4 is a block diagram illustrating the variable delay resolution support unit 160 of FIG. 3 according to another example embodiment of the present invention.

In the example embodiment of FIG. 4, the variable delay resolution support unit 160 may include a first D-type flip-flop (DFF) 161, a second DFF 162 and a third DFF 163. The higher delay resolution clock signal HDRC produced by the clock generator 110 may be applied as the clock signal to the first through third DFFs 161, 162 and 163.

In the example embodiment of FIG. 4, the first DFF 161 may receive the second control word output signal C2 provided from the synchronization unit 150 and may synchronize the received second control word output signal C2 with a rising edge of the higher delay resolution clock signal HDRC, to output the third control word output signal C3. In an example, the delay resolution of the third control word output signal C3 may be lower (e.g., two times lower) than that of the second control word output signal. Likewise, the third control word output signal C3 may have a delay resolution higher (e.g., 12 times higher) than that of the first control word output signal C1.

In the example embodiment of FIG. 4, the second DFF 162 may receive the third control word output signal C3 provided from the first DFF 161. The second DFF 162 may synchronize the received third control word output signal C3 with the rising edge of the higher delay resolution clock signal HDRC to output the fourth control output signal C4. In an example, the delay resolution of the fourth control word output signal C4 may be lower (e.g., two times lower) than that of the third control word output signal C3. Likewise, the fourth control word output signal C4 may have a delay resolution higher (e.g., six times higher) than that of the first control word output signal C1.

In the example embodiment of FIG. 4, the third DFF 163 may receive the fourth control word output signal C4 from the second DFF 162. The third DFF 163 may synchronize the received fourth control word output signal C4 with the rising edge of the higher delay resolution clock signal HDRC to output the fifth control output signal C5. In an example, the delay resolution of the fifth control word output signal C5 may be lower (e.g., two times lower) than that of the fourth control word output signal C4. Likewise, the fifth control word output signal C5 may have a delay resolution higher (e.g., three times higher) than that of the first control word output signal C1.

Returning to the example embodiment of FIG. 3, the output signal selection unit 170 may receive the first control word output signal C1 from the control word output register 130, as well as the second through fifth control word output signals C2, C3, C4 and C5 from the variable delay resolution support unit 160. The output signal selection unit 170 may select and output one of the plurality of control word output signals (e.g., with the selected/output control word synchronized with an operation clock signal of a radio frequency (RF) transceiver chip 300).

In the example embodiment of FIG. 3, the output signal selection unit 170 may be implemented as a multiplexer. The multiplexer 170 may be configured to receive each of the control word output signals C1 through C5, and to select one of the received control word output signals for output in response to a select signal S. In an example, the select signal S may be provided from an external source. In an alternative example, the select signal S may be set in an internal register.

In the example embodiment of FIG. 3, the timing generator 100 may output the first control word output signal C1 synchronized with the base clock signal BC with a first delay resolution, the second control word output signal C2 having a second delay resolution higher (about 24 times higher) than that of the base clock signal BC, the third control word output signal C3 having a third delay resolution higher (e.g., about 12 times higher) than that of the base clock signal BC, the control word output signal C4 having a fourth delay resolution higher (e.g., about six times higher) than that of the base clock signal BC, and the control word output signal C5 having a fifth delay resolution higher (e.g., about three times higher) than that of the base clock signal BC.

Accordingly, in the example embodiments of FIGS. 3 and 4, the output signal selection circuit 170 may select a "best" control word output signal from among the received control word output signals C1, C2, C3, C4 or C5 to selectively output based on an operation clock signal of the RF transceiver chip 300 (e.g., which may be coupled to the timing generator 100). Further, if the connected RF transceiver chip 300 is replaced with another RF transceiver chip having an operation clock signal different from that of the previous RF transceiver chip 300, a control word output signal corresponding to the new RF transceiver chip may be selected (e.g., which may be different than the previously output control word output signal).

Figure 5:
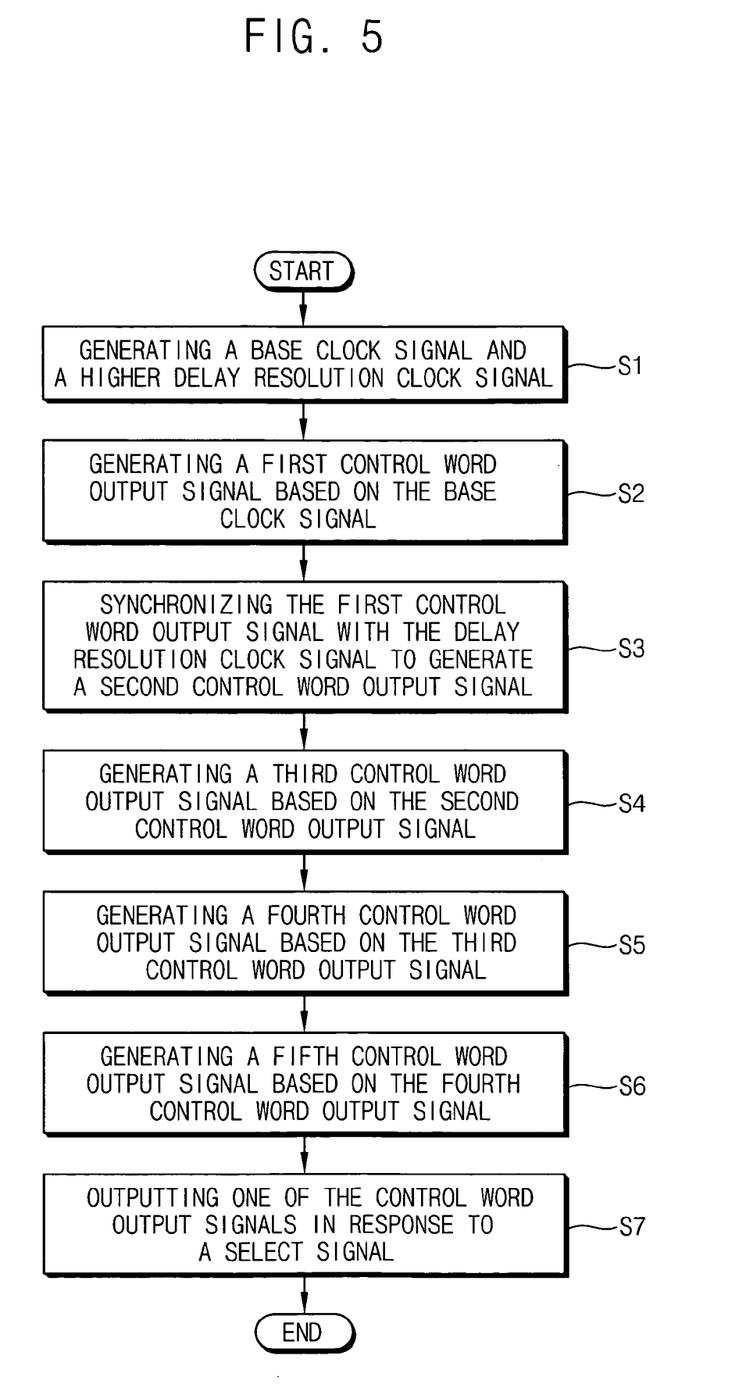
FIG. 5 is a flowchart illustrating a process of generating a control word output signal according to another example embodiment of the present invention.

FIG. 5 is a flowchart illustrating a process of generating a control word output signal according to another example embodiment of the present invention. Below, the example embodiment of FIG. 5 will be described with reference to the example embodiments of FIGS. 3 and 4.

In the example embodiment of FIG. 5, the base clock signal BC and the higher delay resolution clock signal HDRC (e.g., having a unit cycle corresponding to ¹⁄₂₄ of the unit cycle of the base clock signal BC) may be generated by the timing generator 100 (at S1). In an example, the delay resolution of the generated higher delay resolution clock signal HDRC may be 24 times higher than that of the base clock signal BC.

In the example embodiment of FIG. 5, a control word output signal C1 may be generated by synchronizing a control word scheduled to be output with the generated base clock signal BC (e.g., based on clock signal information received from the RAM 64) (at S2).

In the example embodiment of FIG. 5, the first control word output signal C1 may be synchronized with the higher delay resolution clock signal HDRC generated (from S1) to generate a second control word output signal C2 (at S3). In an example, the second control word output signal C2 may have a delay resolution about 24 times higher than that of the first control word output signal C1.

In the example embodiment of FIG. 5, the second control word output signal C2 may be synchronized with a rising edge of the higher delay resolution clock signal HDRC to generate a third control word output signal C3 (at S4). In an example, if a unit cycle of the generated third control word output signal C3 may be two times longer than that of the second control word output signal C2, the third control word output signal C3 may have a delay resolution about 12 times higher than that of the first control word output signal C1.

In the example embodiment of FIG. 5, the third control word output signal C3 may be synchronized with a rising edge of the higher delay resolution clock signal HDRC to generate a fourth control word output signal C4 (at S5). In an example, if a unit cycle of the generated fourth control word output signal C4 is two times longer than that of the third control word output signal C3, the fourth control word output signal C4 may have a delay resolution about 6 times higher than that of the first control word output signal C1.

In the example embodiment of FIG. 5, the fourth control word output signal C4 may be synchronized with a rising edge of the higher delay resolution clock signal HDRC to generate a fifth control word output signal C5 (at S6). In an example, if a unit cycle of the generated fifth control word output signal C5 is two times longer than that of the fourth control word output signal C3, the fifth control word output signal C5 may have a delay resolution about 3 times higher than that of the first control word output signal C1.

In the example embodiment of FIG. 5, one of the first through fifth control word output signals C1, C2, C3, C4 and C5 may be output in response to a received select signal S (at S7). In an example, the select signal S may be used to select a control word output signal having characteristics best suited for a RF transceiver chip 300 coupled thereto from among the first through fifth control word output signals C1, C2, C3, C4 and C5.

In another example embodiment of the present invention, a timing generator (e.g., timing generator 100 of FIG. 3) may selectively output one of a plurality of control word output signals, with each of the plurality of control word output signals being associated with a different delay resolution. The timing generator may thereby adapt to characteristics of an RF transceiver chip coupled thereto.

Example embodiments of the present invention being thus described, it will be obvious that the same may be varied in many ways. For example, while above-described example embodiments of the present invention are described as directed to synchronizing a timing of RF transceiver chips, it is understood that other example embodiments of the present invention may be directed to timing synchronization with any type of external device.

Further, while the first through fifth control word output signals C1, C2, C3, C4 and C5 are above-described as having a particular different delay resolutions with a particular relationship, it is understood that other example embodiments of the present invention may be directed to any number of control word output signals. Also, it is understood that the relationship between the delay resolutions among the different control word output signals may be configured to other criteria in other example embodiments of the present invention. For example, the delay resolutions supported in other example embodiments of the present invention may be based on expected characteristics of RF transceiver chips to be connected to a given timing generator.

Such variations are not to be regarded as a departure from the spirit and scope of example embodiments of the present invention, and all such modifications as would be obvious to one skilled in the art are intended to be included within the scope of the following claims.

What is claimed is:

1. A timing generator, comprising:
   a clock generating unit configured to generate a base clock signal and a higher delay resolution signal, a clock cycle of the higher delay resolution signal being less than a clock cycle of the base clock signal;
   a control word output register configured to generate a first control word output signal by synchronizing a control word with the generated base clock signal;
   a synchronization unit configured to generate a second control word output signal by synchronizing the first control word output signal with the higher delay resolution clock signal; and
   a variable delay resolution support unit configured to generate at least one additional control word output signal based on the second control word output signal and the higher delay resolution clock signal, the first, second and at least one additional control word output signals each having different delay resolutions.

2. The timing generator of claim 1, wherein the clock cycle of the higher delay resolution signal is 1/N of the clock cycle of the base clock signal, where N is a natural number.

3. The timing generator of claim 2, wherein the second control word output signal has a delay resolution N times higher than that of the first control word output signal.

4. The timing generator of claim 2, wherein N is 24.

5. The timing generator of claim 1, further comprising:
a storing unit configured to store clock cycle information for outputting the control word; and
a duration counter configured to provide a clock signal for outputting the first control word output signal based on the base clock signal provided from the clock generating unit and the clock cycle information stored at the storing unit.

6. The timing generator of claim 5, wherein the storing unit is a random-access memory (RAM).

7. The timing generator of claim 5, wherein the clock cycle information is received from an external digital baseband chip.

8. The timing generator of claim 1, wherein the variable delay resolution support unit includes a plurality of D-type flip-flops (DFFs).

9. The timing generator of claim 1, further comprising:
an output signal selection unit configured to select and output one of the first, second and at least one additional control word output signals in response to a select signal.

10. The timing generator of claim 9, wherein the output signal selection unit includes a multiplexer.

11. The timing generator of claim 1, wherein the at least one additional control word output signal includes third, fourth and fifth control word output signals.

12. The timing generator of claim 11, wherein the variable delay resolution support unit includes:
a first DFF configured to receive the second control word output signal, and configured to output the third control word output signal by synchronizing the received second control word output signal with a rising edge of the higher delay resolution clock signal;
a second DFF configured to receive the third control word output signal, and configured to output the fourth control word output signal by synchronizing the received third control word output signal with the rising edge of the higher delay resolution clock signal; and
a third DFF configured to receive the fourth control word output signal, and configured to output the fifth control word output signal by synchronizing the received fourth control word output signal with the rising edge of the higher delay resolution clock signal.

13. The timing generator of claim 12, wherein the third, fourth and fifth control word output signals have a higher delay resolution than that of the first control word output signal.

14. The timing generator of claim 13, wherein the third control word output signal has a delay resolution about 12 times higher than that of the first control word output signal, the fourth control word output signal has a delay resolution about 6 times higher than that of the first control word output signal, and the fifth control word output signal has a delay resolution about 3 times higher than that of the first control word output signal.

15. The timing generator of claim 1, wherein the control word controls a radio frequency (RF) transceiver chip.

16. A method of generating a timing control signal, comprising:
generating a base clock signal and a higher delay resolution clock signal, a clock cycle of the higher delay resolution signal being less than a clock cycle of the base clock signal;
generating a first control word output signal by synchronizing a control word with the base clock signal;
generating a second control word output signal by synchronizing the first control word output signal with the higher delay resolution clock signal; and
generating at least one additional control word output signal based on the second control word output signal and the higher delay resolution clock signal, the first, second and at least one additional control word output signal each having different delay resolutions.

17. The method of claim 16, further comprising:
selecting one of the first, second and at least one additional control word output signals based on a select signal.

18. The method of claim 17, further comprising:
outputting the selected control word output signal.

19. The method of claim 16, wherein the second control word output signal has a delay resolution N times higher than that of the first control word output signal, where N is a natural number.

20. The method of claim 19, wherein N is 24.

21. The method of claim 16, wherein the at least one additional control word output signal includes third, fourth and fifth control word output signals.

22. The method of claim 21, wherein generating the third, fourth and fifth control word output signals includes:
generating the third control word output signal by synchronizing the second control word output signal with a rising edge of the higher delay resolution clock signal;
generating the fourth control word output signal by synchronizing the third control word output signal with the rising edge of the higher delay resolution clock signal; and
generating a fifth control word output signal by synchronizing the fourth control word output signal with the rising edge of the higher delay resolution clock signal.

23. The method of claim 22, wherein the third, fourth and fifth control word output signals have a higher delay resolution than that of the first control word output signal.

24. The method of claim 23, wherein the third control word output signal has a delay resolution about 12 times higher than that of the first control word output signal, the fourth control word output signal has a delay resolution about 6 times higher than that of the first control word output signal, and the fifth control word output signal has a delay resolution about 3 times higher than that of the first control word output signal.

25. A timing generator generating a timing control signal in accordance with the method of claim 16.

* * * * *